United States Patent
Hertling et al.

(10) Patent No.: US 10,803,185 B2
(45) Date of Patent: Oct. 13, 2020

(54) OPTICALLY READABLE FORMAT OF ENCRYPTED DATA

(71) Applicant: Hewlett-Packard Development Company, L.P., Houston, TX (US)

(72) Inventors: William E Hertling, Portland, OR (US); Peter G Hwang, Vancouver, WA (US); Jeremy Barribeau, Portland, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 93 days.

(21) Appl. No.: 15/765,776

(22) PCT Filed: Feb. 5, 2016

(86) PCT No.: PCT/US2016/016776
§ 371 (c)(1),
(2) Date: Apr. 4, 2018

(87) PCT Pub. No.: WO2017/135965
PCT Pub. Date: Aug. 10, 2017

(65) Prior Publication Data
US 2018/0307846 A1 Oct. 25, 2018

(51) Int. Cl.
| | |
|---|---|
| *H01L 29/06* | (2006.01) |
| *G06F 21/60* | (2013.01) |
| *G06F 16/955* | (2019.01) |
| *H04L 9/30* | (2006.01) |
| *H04L 29/06* | (2006.01) |
| *H04L 29/08* | (2006.01) |
| *H04L 9/32* | (2006.01) |

(Continued)

(52) U.S. Cl.
CPC .......... *G06F 21/602* (2013.01); *G06F 3/147* (2013.01); *G06F 16/9566* (2019.01); *G06K 19/06028* (2013.01); *G09C 5/00* (2013.01); *H04L 9/30* (2013.01); *H04L 9/3228* (2013.01); *H04L 29/06* (2013.01); *H04L 63/0428* (2013.01); *H04L 63/107* (2013.01); *H04L 67/02* (2013.01)

(58) Field of Classification Search
CPC .... G06F 21/602; G06F 16/9566; G06F 3/147; G06K 19/06028; G09C 5/00; H04L 63/0428; H04L 63/107; H04L 9/30; H04L 9/3228; H04L 67/02; H04L 29/06
See application file for complete search history.

(56) References Cited

U.S. PATENT DOCUMENTS

| | | |
|---|---|---|
| 6,912,285 B2 | 6/2005 | Jevans |
| 7,562,223 B2 | 7/2009 | Ragnet et al. |

(Continued)

OTHER PUBLICATIONS

Ahmad et al., "A secure network communication protocol based on text to barcode encryption algorithm", International Journal of Advanced Computer Science and Applications, vol. 6, No. 12, (Year: 2015).*

(Continued)

*Primary Examiner* — Morshed Mehedi
(74) *Attorney, Agent, or Firm* — Mannava & Kang

(57) ABSTRACT

Private data to be communicated to a recipient is encrypted with the public key of a public and private key pair associated with the recipient. An optically readable format of the encrypted private data is generated. The optically readable format may be provided to the recipient.

17 Claims, 7 Drawing Sheets

(51) Int. Cl.
*G06F 3/147* (2006.01)
*G06K 19/06* (2006.01)
*G09C 5/00* (2006.01)

(56) References Cited

U.S. PATENT DOCUMENTS

| | | | |
|---|---|---|---|
| 7,657,748 B2 | 2/2010 | Gentry | |
| 9,143,321 B2 | 9/2015 | Senese et al. | |
| 9,363,259 B2* | 6/2016 | Chenna | H04L 63/0823 |
| 2002/0018566 A1 | 2/2002 | Kawatsura et al. | |
| 2004/0139222 A1* | 7/2004 | Slik | G16H 10/60 |
| | | | 709/236 |
| 2005/0041675 A1* | 2/2005 | Trostle | H04L 29/12009 |
| | | | 370/401 |
| 2009/0031139 A1* | 1/2009 | Geoffrey | H04L 9/3231 |
| | | | 713/186 |
| 2012/0308003 A1* | 12/2012 | Mukherjee | H04L 9/3247 |
| | | | 380/243 |
| 2013/0146653 A1* | 6/2013 | Hart | G06Q 40/04 |
| | | | 235/375 |
| 2013/0173915 A1* | 7/2013 | Haulund | H04L 9/3226 |
| | | | 713/159 |
| 2014/0110468 A1* | 4/2014 | Kandregula | G06K 7/1447 |
| | | | 235/375 |
| 2014/0245019 A1 | 8/2014 | Hwang et al. | |
| 2015/0063672 A1 | 3/2015 | Chang | |
| 2015/0358163 A1 | 12/2015 | Carter | |

OTHER PUBLICATIONS

Krombholz et al., "QR Code Security—How Secure and Usable Apps Can Protect Users Against Malicious QR Codes", 10th International Conference on Availability, Reliability and Security, Date of Conference: Aug. 24-27 (Year: 2015).*

Lackey, Ella Deon. Introduction to Public Key Cryptography. https://developer.mozilla.org/~2012~23 pages.

* cited by examiner

OPTICALLY READABLE FORMAT OF ENCRYPTED DATA

BACKGROUND

Data is communicated via various modes. In some instances printed copies of numeric or text data can be provided to users for example via regular mail. Soft copies of data can be provided via electronic messages. For example, a message that data is available or a link to the data is emailed to the users. In another example, data is encoded in a machine-readable format. Bar codes, QR (Quick Response) codes are some examples of data encoded in machine-readable formats. Devices with optical scanners can scan the codes to retrieve data and display the data in a human readable form on a display associated with the client device.

BRIEF DESCRIPTION OF THE DRAWINGS

Features of the present disclosure are illustrated by way of example and not limited in the following figure(s), in which like numerals indicate like elements, and in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Machine-readable or optically-readable printed (or electronic displays) codes have many benefits. One of these includes acting as a digital reference to data. For example, a printed document can contain a scannable code linking to the digital version of the same document. A postcard could include a code which may be linked to an ebook. Transmission of data via these modalities has substantial business and personal value to the end user. However, the scannable codes are not secure which limits their application to publicly available data and makes them unusable for conveying personal data. For example, it would not be feasible to link a QR code to a person's medical records as anyone who accesses the QR code will be able to access the person's medical records. Other modalities of providing personal data require user authentication procedures which can be inconvenient when using small mobile devices.

The examples disclosed herein enable encoding of data in optically-readable or scannable formats. Private data associated with a recipient can be encoded in an optically-readable format that is further secured with the recipient's public key. The private data that is thus formatted and secured is communicated to the recipient who employs the corresponding private key to decrypt the data. The optically-readable data formats can therefore be modified with a recipient's public key thereby providing the necessary security layer that enables communication of the recipient's private data.

Figure 1:
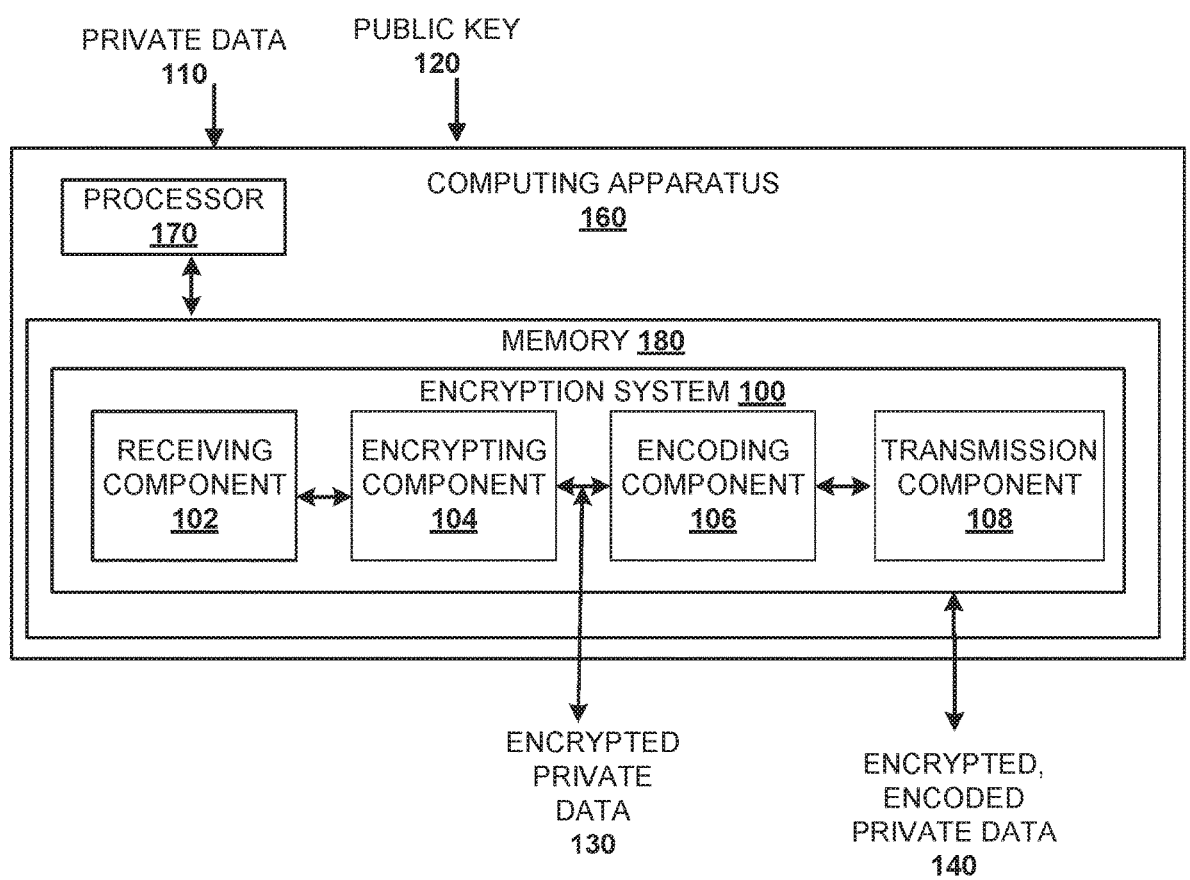
FIG. 1 is a block diagram of one example of a computing device that includes an encryption system.

FIG. 1 is a block diagram of one example of a computing apparatus 160 that includes a processor 170 configured to execute an encryption system 100 stored in a memory 180. The encryption system 100 enables encrypting personal data associated with a recipient into secure, optically readable format. The optically readable formats can include data formats which can be detected and decoded by a device employing optical components to detect or scan the data. The private data is secured with the recipient's public key so that only the particular recipient who can provide the corresponding private key will be able to decrypt and review the data. A receiving component 102 which can include processor-executable instructions in one example, is configured to receive private data 110 that is intended for transmission to a recipient. The private data 110 may include for example, the recipient's personal data such as medical records, financial data, ebook purchases, professional data or other confidential data that is otherwise unavailable in the public domain and which data is intended to remain private during the transmission to the recipient. The private data 110 can be data which was captured by various devices such as but not limited to printers, scanners, fax machines, data manually entered or automatically entered via a computing device. Indeed the private data 110 can be captured via any form that is currently known or to be invented. In one example, an obfuscated URL (Universal Resource Locator) like http://www.hp.com/employeerecords/23lknkjnf8f3uf3fn344sckjrd1234jdkjef4w links to file including text, numeric or other data. In addition, a public key 120 from a private/public key pair of the recipient to whom the data is to be sent is also received. In one example, a data store of public keys can be accessed by the encryption system 100 and the public key of the recipient can be selected.

An encrypting component 104 accesses the private data 110 and the public key 120 to encrypt the private data 110 using the public key 120. Techniques which are currently known or to be invented can be used for the data encryption. The encrypted private data 130 is then encoded by the encoding component 106 in an optically-readable format. For example, the encrypted private data 130 can be encoded as a bar code or a QR code which are readable by optical scanners. Generally the bar codes or QR codes encode public data. In one example where the private data 110 is received in a URL, the encrypted URL can be prefixed with a unique string to enable the scanning software in the client device determine the correct way to interpret it. Prefixes such as but not limited to "private:<cyphertext> or "pk-encrypted:<cyphertext>" can be used to aid in the interpretation of the encrypted optical readable formats.

The encrypted private data 130 which is now encoded into an optically readable format is obtained by the transmission component 108 for sending to the recipient. In one example, the encrypted and encoded private data 140 is printed out on paper by the transmission component 108 for sending to the recipient. In one example, the encrypted and encoded private data 140 can be provided on a billboard or a light board. In one example, the encrypted and encoded private data 140 can be transmitted to the recipient over a network or via direct transmission between devices over one or more transmission mediums. The recipient can scan the encrypted and encoded private data 140 via a computing device including a scanner for obtaining the information. In an example, the recipient's computing device (not shown) may scan or capture only a portion of a document in order to effectively recognize the optically readable format of the encrypted and encoded private data 140. The optically readable format may be contained within a demarcated portion of the display such as a paper or billboard or the optically readable format may be repeated across a document/bill board.

Figure 2:
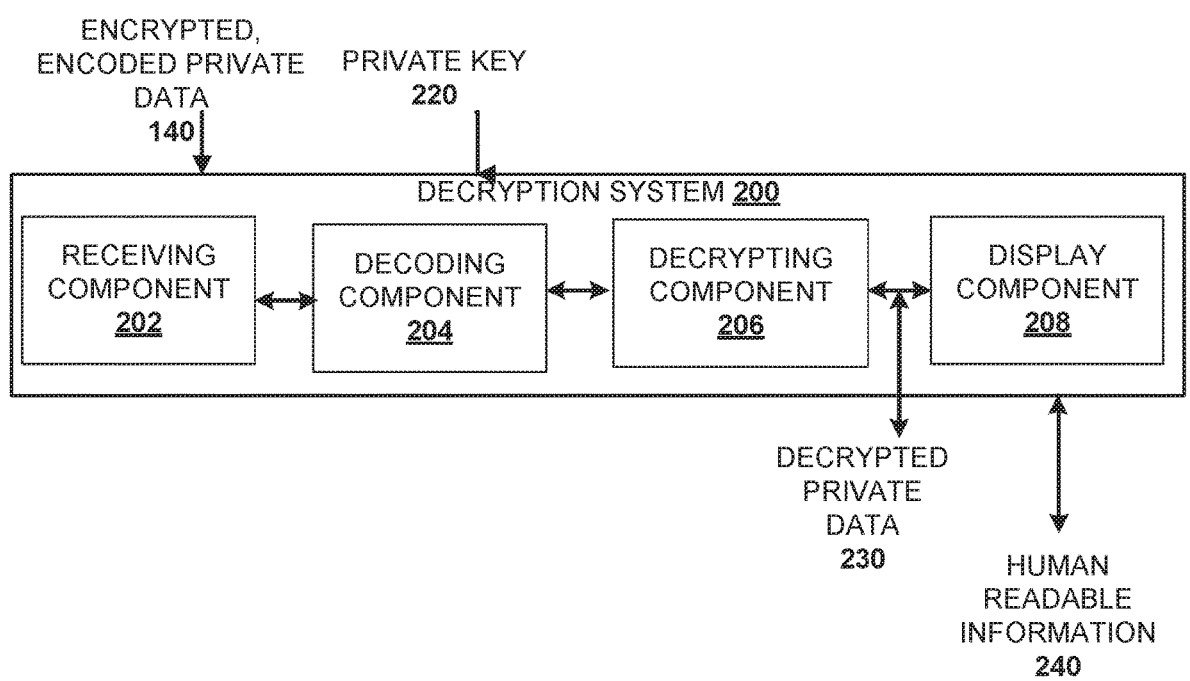
FIG. 2 is a block diagram of one example of a decryption system that enables providing private data via optically readable formats.

FIG. 2 is a block diagram of one example of a decryption system 200 that enables providing private data via optically readable formats. The decryption system 200 comprises a receiving component 202 which receives the encrypted, encoded private data 140. In an example, the encrypted, encoded private data 140 may be formatted in an optically readable format such as a bar code or QR code printed on a paper. In an example, the encrypted, encoded private data 140 can be in an optically readable format such as a bar code or QR code displayed on a notice board.

The decoding component 204 initially attempts to decode the data received in the optically readable format. As discussed earlier, if a prefix such as "private:<cyphertext> or "pk-encrypted:<cyphertext>" is included in the encrypted and encoded private data 140, the decoding component 204 reads it as a URL encrypted by a public key. Accordingly, the data is transmitted to the decryption component 206 which attempts to retrieve the private key 220 corresponding to the public key 120 that was used to encrypt the private data 110. In an example, the private key 220 corresponding to the public key 120 which was used to initially encrypt the private data 110 can be retrieved from one of a local storage of a device that runs the decryption system 200. The retrieved private key 220 is used to decrypt the data in the encrypted URL. The decrypted private data 230 is provided to the recipient via a display component 208 as human readable information 240. It may be appreciated that the encrypted data need not be retrieved from the same server which initially sent the encrypted, encoded private data 140. Instead, the URL may link to a different server than the one sending the encrypted, encoded private data 140 to the recipient. In an example, the display component 208 can present the human readable information 240 on a display screen. Furthermore, the human readable information 240 can be shared with other users if the recipient so chooses.

Figure 3A:
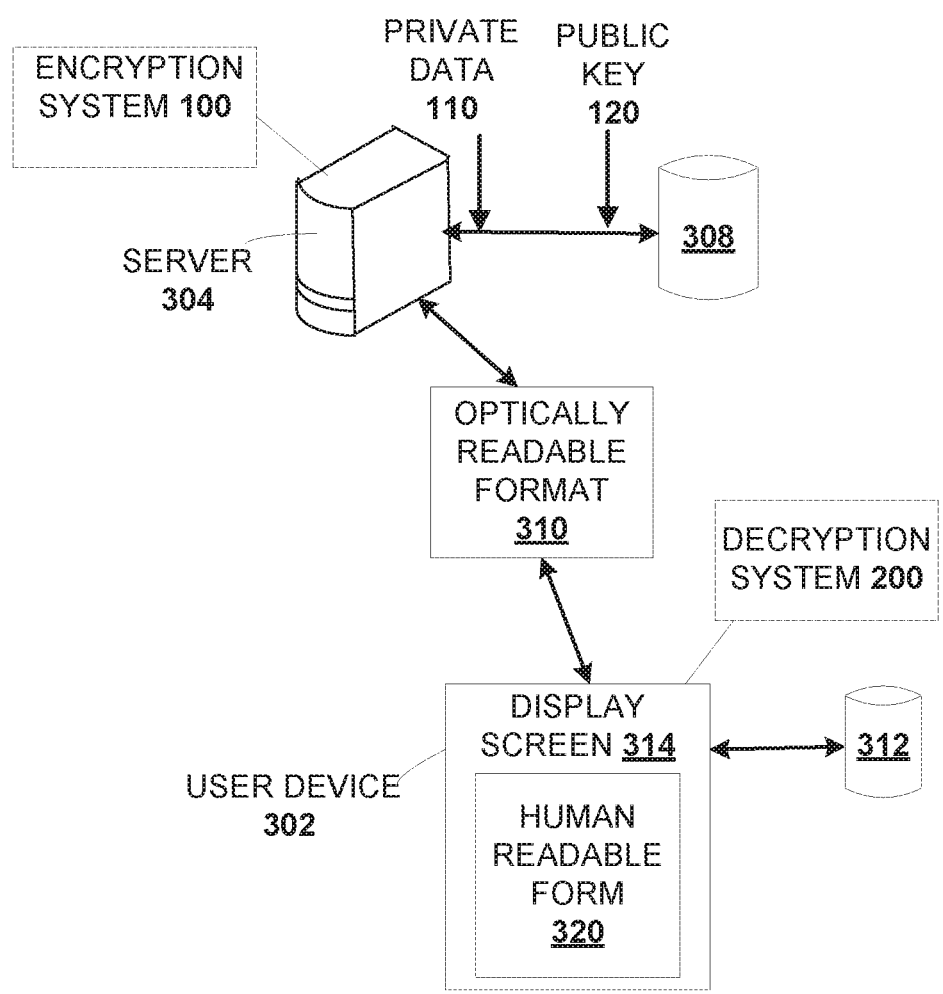
FIG. 3a illustrates a schematic diagram of one example of a communication system that includes the encryption system and decryption system.

FIG. 3A illustrates a schematic diagram of one example of a communication system 300 that includes the encryption system 100 and decryption system 200. In the communication system 300, a server 304 executes the encryption system 100 sends data in optically readable format to a user device 302 which runs the decryption system 200. The user device 302 can be any mobile or stationary computing device such as but not limited to, a desktop, a laptop, a tablet device, a smartphone, a wearable computing device such as a smartwatch and the like. As mentioned supra, private data 110 can be data captured via any procedure and/or via any device. In an example, the private data 110 can be data that was captured by a device disparate from the user device 302 or the server 304. In an example, the private data 110 can be data captured by the user device 302 itself. When the server 304 receives private data 110 for a recipient associated with the user device 302, the server 304 retrieves a public key 120 associated with the recipient from a data storage 308. The private data 110 encrypted with the recipient's public key 120 is converted to an optically readable format 310. In an example, the public key 120 can be selected from a plurality of public keys stored on the data storage 308. The private data 110 thus encrypted and encoded, can be provided to the recipient via a hard copy which has the optically readable format 310 printed thereon in one example. In one example, the optically readable format 310 can be displayed on a public notice board. As it is encrypted with the recipient's public key 120, no party other than those who have access to the corresponding private key 220 will be able to read the private data 110.

Upon receiving the optically readable format 310 either via a hard copy such as a printed envelop or via a billboard, the recipient can use his/her user device 302 to read the private data 110. In one example, the decryption system 200 as described herein can be incorporated as a component into a QR/barcode reader app and which is further configured to access a private key. The decryption system 200 on the user device 302 retrieves the recipient's private key 220 from a data store 312 for example. The retrieved private key 220 is applied to the received optically readable format 310 in order to decrypt it. Upon decryption, the private data 110 is displayed to the recipient on a display screen 314 of a user device in human readable form 320. The encryption/decryption systems as disclosed herein enable easing the access to private data of a recipient without compromising the security or privacy of the data. For example, when private data such as but not limited to bills or health records are mailed to a recipient, an optically readable format of the private data can also be printed on the envelope. This facilitates the recipient to access the private data in the envelope just by scanning the optically readable format on the envelope with a user device.

Figure 3B:
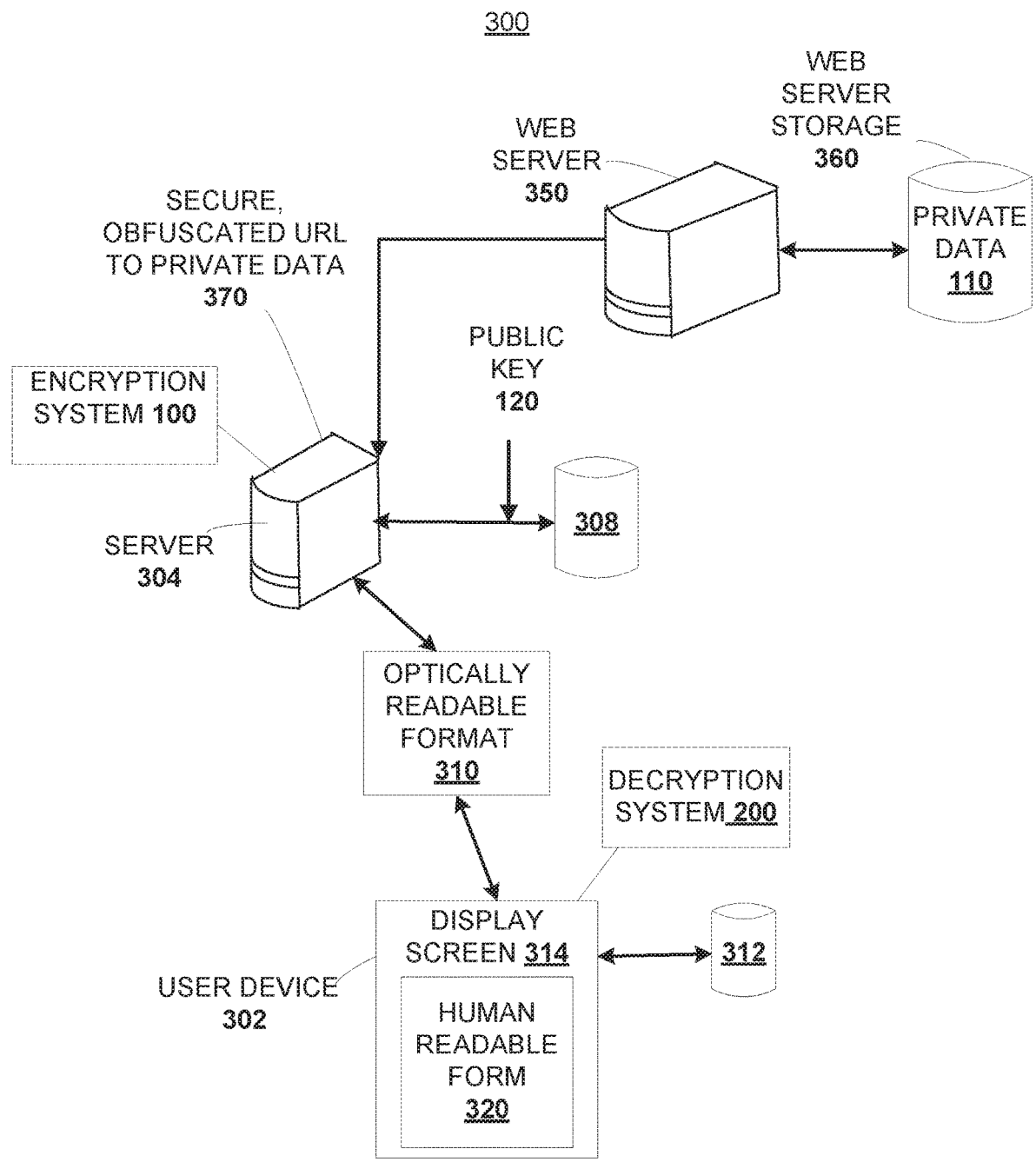
FIG. 3b illustrates a schematic diagram of one example of a communication system that includes the encryption system and decryption system using encrypted URLs.

FIG. 3B illustrates a schematic diagram of wherein the communication system 300 communicates confidential information via encrypted URLs. Many elements of FIG. 3B are similar to FIG. 3A and hence their description is omitted for brevity. A webserver 350 which has the private data 110 stored on its associated web server storage 360 is accessed by the server 304 which executes the encryption system 100. A public key 120 associated with the recipient is retrieved and a URL that refers to a location on the webserver's storage 360 is encrypted with the public key 120 to generate a secure, obfuscated URL 370. The URL 370 is then encoded into an optically readable format 310 using encoding techniques which are currently known or which are to be invented. The optically readable format 310 is communicated to the recipient either as a hard copy or via a display.

Upon scanning the optically readable format 310, the user device 302 identifies that the optically readable format 310 encodes an encrypted URL. As discussed herein, a prefix such as but not limited to "private:<cyphertext> or "pk-encrypted:<cyphertext>" can be used to allow the decryption system 200 to identify encrypted URLs. An encrypted URL thus identified is decrypted via the recipient's private key 220. The resulting information is the private data 110 retrieved from the webserver 350 can be shown on the display screen 314 of the user device 302. Access to private data is thus provided to the recipient without requiring the recipient to open the envelope or logging in to the website associated with the encrypted URL.

Multiple layers of authentication can be enabled via transmission of encrypted data as described above. For example, the encryption system 100 on the server 304 may be configured to use additional factors such as but not limited to geo-location data including data such as GPS data of the user device 302 for authentication. This enables enforcing geographical boundaries from which the encrypted data may be accessed. In an example, the ownership data of an accessing device such as the user device 302 may also be additionally verified in order to provide access to the private data 110. The ownership data can include for example, a unique user ID associated with the accessing device or an identifier that is uniquely associated with the hardware of a particular computing device. Thus, even if a party gains unauthorized access to the private keys, the encrypted, encoded data 140 remains inaccessible to the unauthorized party unless one or more of the location data or device ownership data is cleared. In an example, secure access credentials, such as but not limited to, username and temporary password can also be included in the encrypted URL 370. Upon decryption of the encrypted URL 370 by the decryption system 200, a login page can be displayed on the display screen 314. Entry of the user name and temporary password extracted from the encrypted URL 370 via the login page, can provide access to the private data 110 resident on the webserver's storage 360. An extra layer of security is therefore added for the protection of the private data 110.

Figure 4:
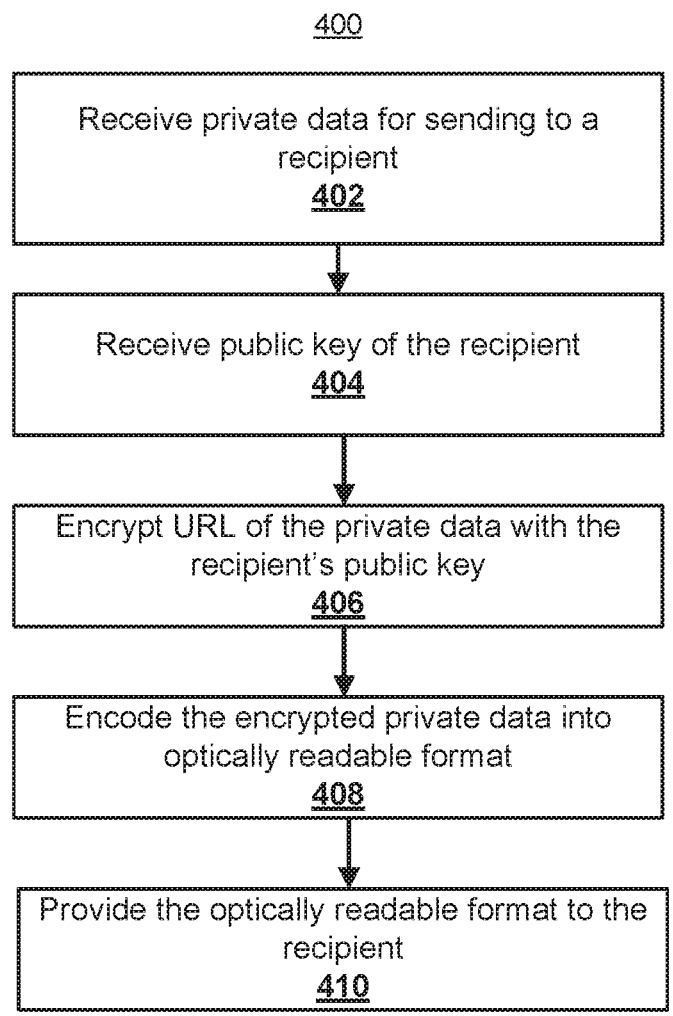
FIG. 4 is a flowchart that details an example of a method of encryption.

FIG. 4 is a flowchart 400 that details an example of a method of encryption. The method begins at 402 wherein private data 110 for communication to a recipient is received. The encrypted data can initially be placed at a data storage location and access to the data storage location is provided via a URL. In addition, a public key 120 corresponding to a private key 220 of the recipient is also received at 404. At 406, the URL of the private data 110 is encrypted with the recipient's public key 120 thereby generating an obfuscated URL. In an example, the encrypted URL can be prefixed with a unique string to aid the scanning software in accurately interpreting it. The obfuscated URL or the encrypted private data may be further encoded in the optically readable format at 408. Any known digital watermarking technology that is currently available such as but not limited to, HP Link/Live Paper, barcoding technology or technology which is to be invented can be used to generate the optically readable format. The optically readable format is provided at 410 for sending to the recipient. The recipient can be provided with the optically readable format via a hard copy which may have the optically readable format of the encoded private data printed thereon. In one example, the recipient can be provided with the optically readable format via a soft copy displayed for example, on a billboard or other surface.

Certain packaging labels exist where scanning the barcode/QR code provides the data rather than the URL/link to the data. The encryption/decryption systems as described herein can also be used in such applications. For example, the private data rather than a link to the private data, can be encrypted with a recipient's public key and encoded in an optically readable format. When scanned by the recipient's user device, the optically readable format can provide data which is decrypted using the recipient's private key and displayed on a screen of the user device. Hence, not only the data locations, but the data itself can be provided in formats described herein. Use cases also exist wherein ownership of physical media warrants access to its original or digital version. In such a case, the encrypted and encoded data 140 comprises the physical content in a higher quality or more versatile digital format as opposed to a link/document providing access to another document.

Furthermore, it may be noted that a single decryption system can be configured with multiple private keys. When data encrypted with one of the corresponding public keys is received, the appropriate private key is automatically selected. The data is decrypted with the selected private key and displayed to a user in human readable format. For example, a recipient may therefore use a single decryption system for receiving secured private data or secured professional data at the same user device.

Figure 5:
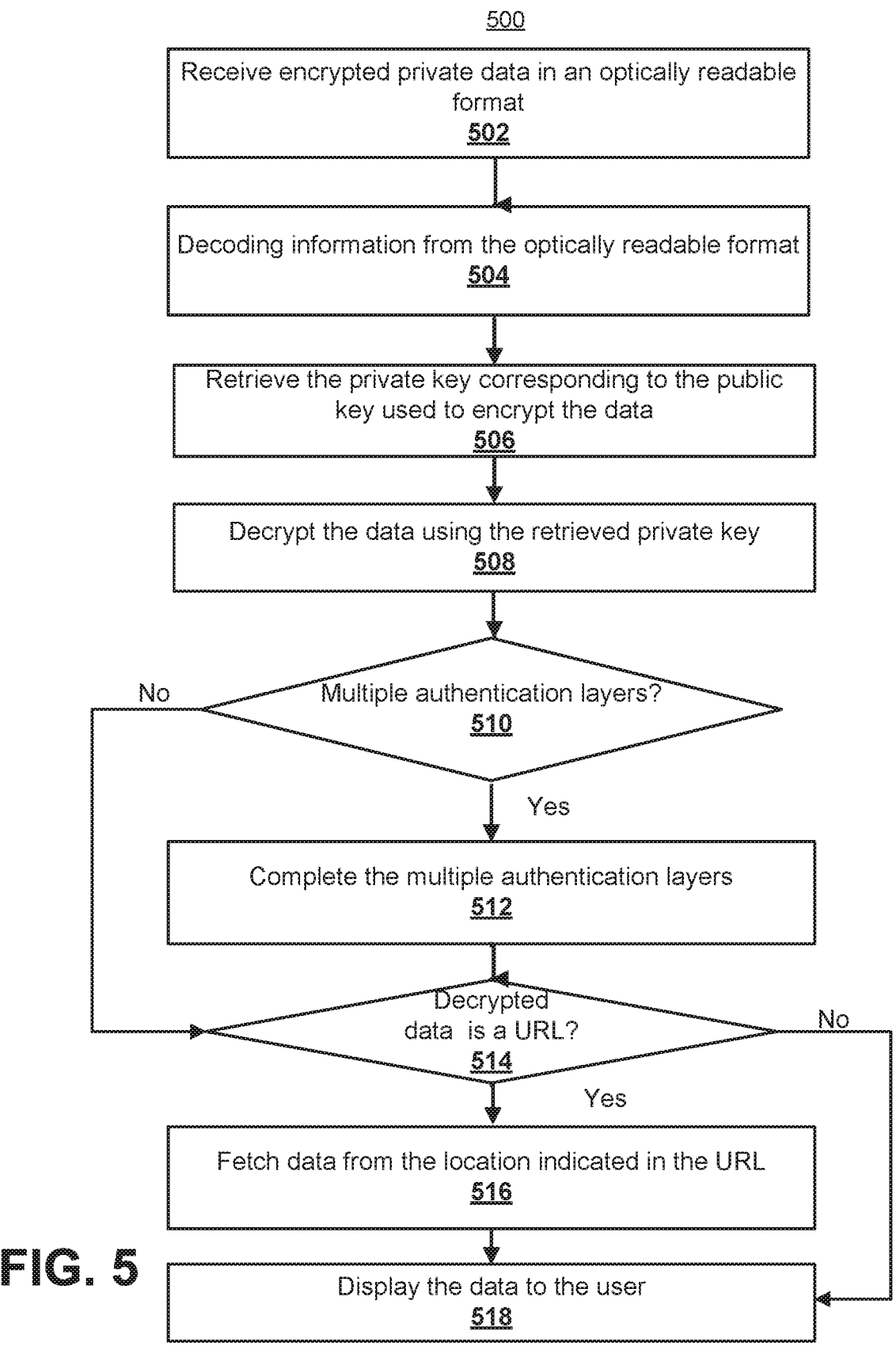
FIG. 5 is an example of a method to decrypt data of a recipient.

FIG. 5 is an example of a method 500 to decrypt data of a recipient. The method begins at 502 wherein encrypted private data is received in the optically readable format such as but not limited to a barcode, QR code and the like. At 504, the information in the optically readable format is decoded. For example, a pattern such as but not limited to a bar code or a QR code is scanned at 504. If it is determined that the decoded information is not in human readable format, it can be concluded that the information is encrypted. Accordingly, at 506, the private key of the recipient corresponding to the public key used to encrypt the data is retrieved. The retrieved private key is used to decrypt the data at 508. At 510, it is determined if multiple authentication layers are enabled. For example, a combination of authentication procedures that include verification of a location or device ownership data can be used with the public/private key encryption to provide access to the private data. If yes, then the multiple layers or authentication are completed at 512. For example, information such as one or more of the location data of a computing device employed by a recipient or ownership of the recipient's computing device can be transmitted to a requesting server, such as the servers 304 or 350 to complete the multiple authentication layers. If multiple authentication layers including the location or ownership data are not enabled, the method proceeds to 514 wherein it is determined if the decrypted data is a URL. If yes, the location indicated by the URL is automatically accessed and its data is received at 516. In an example, the URL can include secure access credentials such as a user name and temporary password. In this case, the recipient may need to enter the secure access credentials received in the URL in order to access the encrypted private data. The data is then displayed in the human readable format at 516 on a display screen of a user device. If it is determined at 514 that the decrypted data does not include a URL, the method proceeds to 518 wherein the decrypted data itself is displayed to the recipient on a display screen.

Figure 6:
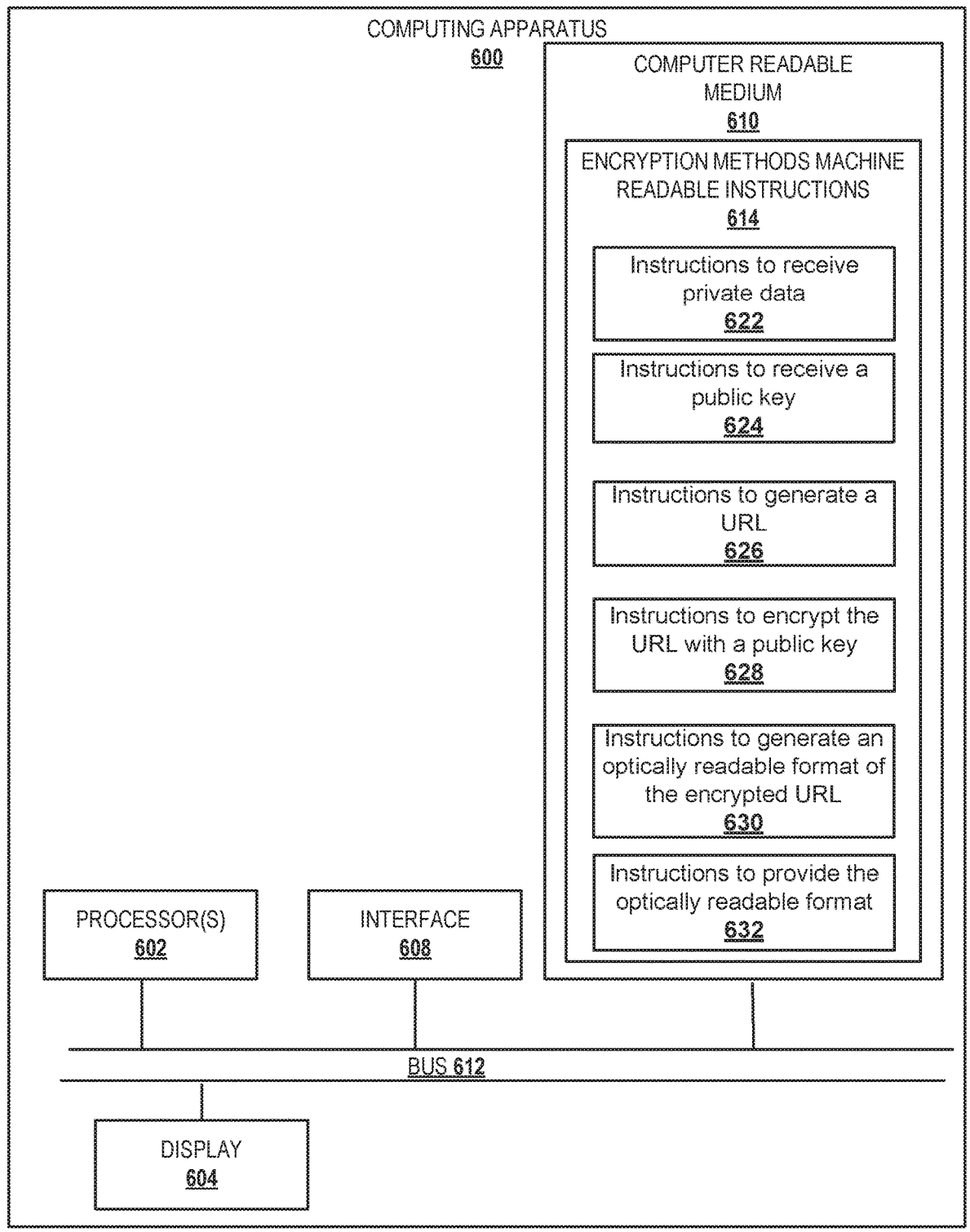
FIG. 6 shows a schematic representation of a computing apparatus according to an example.

Turning now to FIG. 6, there is shown a schematic representation of a computing apparatus 600, which may be equivalent to the computing apparatus 160 depicted in FIG. 1, according to an example. The computing apparatus 600 may include a processor 602, a display 604; an interface 608; and a memory 610, which may be a computer readable storage medium. Each of these components may be operatively coupled to a bus 612. For example, the bus 612 may be an EISA, a PCI, a USB, a FireWire, a NuBus, or a PDS.

The memory 610 may be any suitable medium that participates in providing instructions to the processor 602 for execution. For example, the memory 610 may be non-volatile media, such as an optical or a magnetic disk; volatile media, such as memory. The memory 610 may also store machine readable instructions 614 for encryption methods, which, when executed may cause the processor 602 to perform some or all of the methods depicted in FIGS. 4-5. For example, the instructions 614 may include instructions to receive private data for secure communication to a recipient 622, instructions to receive a public key from a public/private key pair associated with the recipient 624, instructions to generate a URL linking to a storage location of the private data 626, instructions to encrypt the URL with the public key 628, instructions to generate an optically readable format of the encrypted URL 630 and instructions to provide the optically readable format of the encoded URL to the recipient 632.

Similar apparatus may be used for executing the decryption methods. For a decrypting apparatus such as the user device 302, the instructions 614 may include instructions to receive encrypted private data in an optically readable format, instructions to determine that information from the optically readable format is encrypted, instructions to retrieve a private key corresponding to a public key used to encrypt the private data, instructions to decrypt the private data using the private key and instructions to display the private data in a human readable format on a display of the user device 302.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A computing apparatus comprising:
   a processor,
   and a non-volatile memory, wherein the memory stores machine-readable instructions that cause the processor to:
   receive encrypted information in an optically readable format;
   decode the encrypted information from the optically readable format;
   retrieve a private key corresponding to a public key used for the encrypted information, wherein the private key and the public key are associated with a recipient of the encrypted information;
   decrypt the encrypted information using the private key;
   determine if the decrypted information comprises one of private data or a Universal Resource Locator (URL) to a storage location of the private data, wherein the storage location of the private data is disparate from a server providing the encrypted information in the optically readable format;
   if the decrypted information comprises the private data, display the decrypted private data in a human readable format; and
   if the decrypted information comprises the URL to the storage location of the private data,
   retrieve the private data from the storage location indicated by the URL, and display the retrieved private data in the human readable format.

2. The computing apparatus of claim 1, wherein the processor is further to:
   scan the optically readable format in from a surface of a paper.

3. The computing apparatus of claim 1, wherein the processor is further to:
   select the private key from a plurality of private keys on a data store.

4. The computing apparatus of claim 1, wherein the optically readable format is one of a bar code and a Quick Response (QR) code.

5. The computing apparatus of claim 1, wherein the processor is further to:
   provide verification of one of location information or an accessing device ownership data for access to the private data.

6. The computing apparatus of claim 5, wherein to access the private data, the processor is to:
   provide Global Positioning System (GPS) coordinates of the computing apparatus as the location information.

7. The computing apparatus of claim 1, wherein the URL comprises a prefix indicative of an encryption of the URL.

8. The computing apparatus of claim 1, wherein the URL further comprises secure access credentials.

9. A method comprising:
   receiving encrypted information in an optically readable format;
   decoding the encrypted information from the optically readable format;
   retrieving a private key corresponding to a public key used for the encrypted information, wherein the private key and the public key are associated with a recipient of the encrypted private data;
   decrypting the encrypted information using the private key;
   determining if the decrypted information comprises one of private data or a Universal Resource Locator (URL) to a storage location of the private data, wherein the storage location of the private data is disparate from a server providing the encrypted information in the optically readable format;
   displaying the decrypted private data in a human readable format on a display screen if the private data does not comprise the URL; and
   displaying the private data retrieved from a location indicated by the URL if the decrypted private data comprises the URL.

10. The method of claim 9, wherein displaying the private data retrieved from a location indicated by the URL further comprises:
    accessing the storage location comprising the private data via the URL; and
    retrieving the private data from the storage location via the URL;
    extracting access credentials supplied in the URL; and
    providing the extracted access credentials via a login page for access to the private data.

11. The method of claim 10, wherein displaying the private data retrieved from a location indicated by the URL further comprises:
    providing geographical location data for access to the private data.

12. The method of claim 9, wherein retrieving the private key further comprises:
    selecting the private key from a data store comprising a plurality of private keys.

13. A non-transitory computer readable storage medium comprising machine readable instructions executable by at least one processor to:
- receive encrypted information in an optically readable format;
- decode the encrypted information from the optically readable format;
- retrieve a private key corresponding to a public key used for the encrypted information, wherein the private key and the public key are associated with a recipient of the encrypted information;
- decrypt the encrypted information using the private key;
- determine if the decrypted information comprises one of private data or a Universal Resource Locator (URL) to a storage location of the private data, wherein the storage location of the private data is disparate from a server providing the encrypted information in the optically readable format;
- if the decrypted information does not include the URL, display the private data from the decrypted information in a human readable format on a display screen; and
- if the decrypted information comprises the URL to the storage location of the private data,
    - display the private data retrieved from the storage location indicated by the URL.

14. The non-transitory computer readable storage medium of claim 13, further comprising machine readable instructions executable by the at least one processor to:
- interpret the URL based on a prefix of the URL, wherein the prefix includes a phrase indicative of an encryption of the URL.

15. The non-transitory computer readable storage medium of claim 13, further comprising machine readable instructions executable by the at least one processor to:
- complete multiple authentication layers that provide access to the private data, wherein completing the multiple authentication layers includes providing one or more of a location of a user device employed by the recipient for accessing the private data and a device ownership data of the user device.

16. The non-transitory computer readable storage medium of claim 15, wherein the machine readable instructions for completing multiple authentication layers authenticating the location of the user device cause the at least one processor to:
- provide Global Positioning System (GPS) data of the user device.

17. The non-transitory computer readable storage medium of claim 15, wherein the machine readable instructions for completing multiple authentication layers authenticating the device ownership data cause the at least one processor to:
- provide a unique identifier associated with a hardware of the user device as the device ownership data of the user device.

* * * * *